Figure 1:
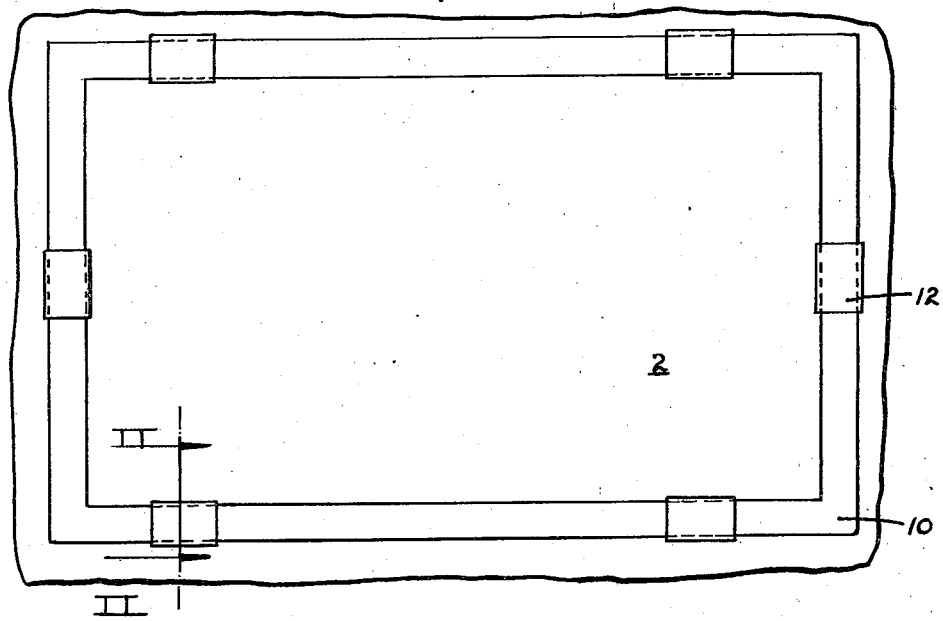

Dec. 22, 1942.  P. H. BALDWIN ET AL  2,306,327

SEALED MULTIPLE GLAZED UNIT

Filed March 9, 1940

INVENTORS
PAUL H. BALDWIN and
OSCAR D. ENGLEHART

BY Olew E. Bee
ATTORNEY.

Patented Dec. 22, 1942

2,306,327

UNITED STATES PATENT OFFICE 2,306,327

SEALED MULTIPLE GLAZED UNIT

Paul H. Baldwin, Tarentum and Oscar D. Englehart, Brackenridge, Pa., assignors to Pittsburgh Plate Glass Company, a corporation of Pennsylvania Application March 9, 1940, Serial No. 323,206

5 Claims. (Cl. 20—56.5)

The present invention relates to window constructions and more particularly to a multiple glazed unit adapted for use in such installations.

One object of the invention is the provision of a multiple glazed unit which is permanently sealed to prevent penetration of dust or other foreign matter into the unit and to restrict the infiltration of moisture therein, thus increasing the effective life of the unit.

Another object of the invention is the provision of protected seals by means of which the passage of moisture vapor therethrough can be reduced to a minimum.

Other objects and advantages of the invention will become more apparent from the following detailed description of a preferred embodiment thereof.

The earliest attempts to manufacture satisfactory multiple glazed insulating units involved the thought of sealing the edges of spaced glass sheets in such manner that the centrally enclosed air space would remain substantially anhydrous and condensation of moisture upon the inner surfaces of the glass sheets would be prevented. It was soon discovered, however, that the "breathing" action of such units when exposed to temperature and pressure differentials destroyed the seal permitting the infiltration of moisture into the unit. Furthermore, the sealing mediums available were not all impermeable to moisture vapor.

In an endeavor to offset these disadvantages, tubes of dehydrating material were incorporated into the units. This expedient, while controlling the moisture content of the enclosed air space for a reasonable length of time, also accelerated the infiltration of moisture into the unit by increasing the vapor pressure differential between the enclosed air and the atmosphere. It was necessary, therefore, to provide for ready replacement of the dehydrating agent.

The control of moisture content, while reducing the possibilities of vapor condensation within the unit, did not prevent dust or other foreign material from entering the unit, settling upon the inner surfaces of the glass sheets and impairing the transparency thereof. Accordingly, there was developed a demountable unit in which the auxiliary frame could be removed at intervals to permit cleaning of the glass, replacement of the desiccants, the seals and spacers. Obviously, in connection with these units, the maintenance costs are considerable.

Briefly stated, the present invention contemplates a permanently sealed unit in which a plastic sealing medium having a low rate of diffusion and possessing permanent elasticity is protected by a metal foil. The elastic seal permits the glass sheets of the unit to shift in the "breathing" action while at the same time a firm bond between the seal and the glass is maintained.

Figure 2:
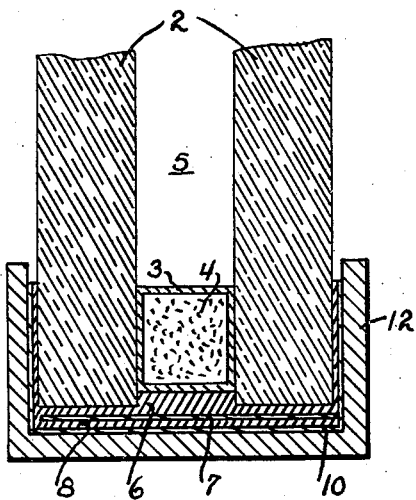
Figure 3:
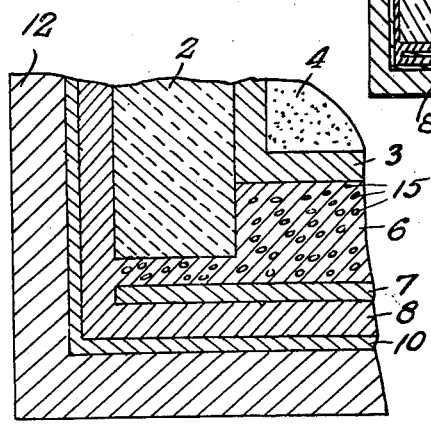

In the drawing, Figure 1 is a front elevational view of a multiple glazed unit embodying the principles of our invention, Figure 2 is a fragmentary vertical section thereof taken substantially along the line II—II of Figure 1, and Figure 3 is a fragmentary view on an enlarged scale of a portion of Fig. 2.

Referring to the drawing, a plurality of glass sheets 2 are arranged in parallel relation and spaced by a hollow metal tube 3 positioned adjacent their outer edges. The tube 3 carries, at least in a portion of its length, a filling 4 of a dehydrating material, such as activated alumina or calcium sulfate, which will be in communication with the space 5 intermediate the glass plates. A relatively thin layer 6 of adhesive caulking compound is spread over the outer edges of the glass sheets and the exposed surface of the metal tube 3. A ribbon 7 of continuous metal foil, such as aluminum or lead, drawn or rolled to a thickness of from 0.003 to 0.005 of an inch, is applied over the adhesive layer 6 and forced into close contact therewith. A second layer 8 of adhesive caulking compound, or if desired a pressure sensitive adhesive, is spread over the metal ribbon 7 and the exposed outer surfaces of the glass sheets 2. Another ribbon 10 of metal foil is applied over the adhesive layer 8 to complete the seal. Metal clips 12 are added to the assembly at suitable intervals about the periphery to increase the mechanical strength thereof.

The adhesive caulking compound is preferably selected from that group which possesses permanent elasticity, as for example, a mixture of the heavier fractions obtained from the distillation of hydrocarbons or rubber containing compounds, and which possess a low diffusion rate. The pressure sensitive adhesive which may be used for the layer 8 is also of a low diffusion rate material, such as a rubber cement. Since the metallac ribbons 7 and 10 are continuous and impermeable to vapor the only possibility for moisture vapor infiltration into the unit is through the relatively long thin adhesive path between the metal ribbon 10 and the glass plates 2. The adhesive layer has a low diffusion rate and accordingly moisture infiltration therethrough is reduced to a minimum, thus prolonging the effective life of the unit.

A further restriction upon this infiltration of moisture is possible by combining a dehydrating material 15, such as finely divided calcium sulfate, with the adhesive caulking compound forming the layer 6. The dehydrating material is thus placed in a position wherein it will absorb the slight amount of moisture diffusing through the adhesive layer.

What we claim is:

1. A multiple glass unit comprising a plurality of glass plates arranged in spaced parallel relation, a layer of vapor-proof adhesive, having dispersed therethrough particles of a desiccating material, sealing the edges of the glass plates, and a ribbon of continuous metal foil superposed upon and protecting adhesive layer.

2. A multiple glazed unit comprising a plurality of glass plates arranged in spaced parallel relation, a layer of vapor-proof adhesive, having dispersed therethrough particles of a desiccating material, sealing the edges of the glass plates, a ribbon of continuous metal foil superposed upon the adhesive layer and supplementary layers of adhesive and metal foil applied to the plate edges and extending inwardly over the exposed surfaces of the plates.

3. A multiple glazed unit comprising a plurality of glazed plates arranged in parallel relation, a hollow metal tube interposed between the glass plates adjacent their edges and spacing the plates, a layer of vapor-proof adhesive, having dispersed therethrough particles of a desiccating material, sealing the edges of the glass plates and a ribbon of continuous metal foil superposed upon the adhesive layer.

4. A multiple glazed unit comprising a plurality of glass plates arranged in parallel relation, a hollow metal tube interposed between the glass plates adjacent their edges and spacing the plates, a layer of vapor-proof adhesive, having dispersed therethrough particles of a desiccating material, sealing the edges of the glass plates, a ribbon of continuous metal foil superposed upon the adhesive layer, supplementary layers of adhesive and metal foil applied to the plate edges and extending inwardly over the exposed surfaces of the plates and metal reinforcing clips binding the unit at spaced intervals around the periphery of the plates.

5. A multiple glazed unit as defined in claim 4 in which the hollow metal tube contains a dehydrating agent which is in communication with the space intermediate the glass plates.

PAUL H. BALDWIN.
OSCAR D. ENGLEHART.